Dec. 25, 1956  H. N. STEPHAN  2,775,130
COMBINED HORIZONTAL BORING, DRILLING AND MILLING MACHINE
Filed May 29, 1953  2 Sheets-Sheet 1

INVENTOR.
HALLIS N. STEPHAN
BY Hudson Boughton
Williams, David & Hoffmann
ATTORNEYS Dec. 25, 1956 H. N. STEPHAN 2,775,130
COMBINED HORIZONTAL BORING, DRILLING AND MILLING MACHINE
Filed May 29, 1953 2 Sheets-Sheet 2
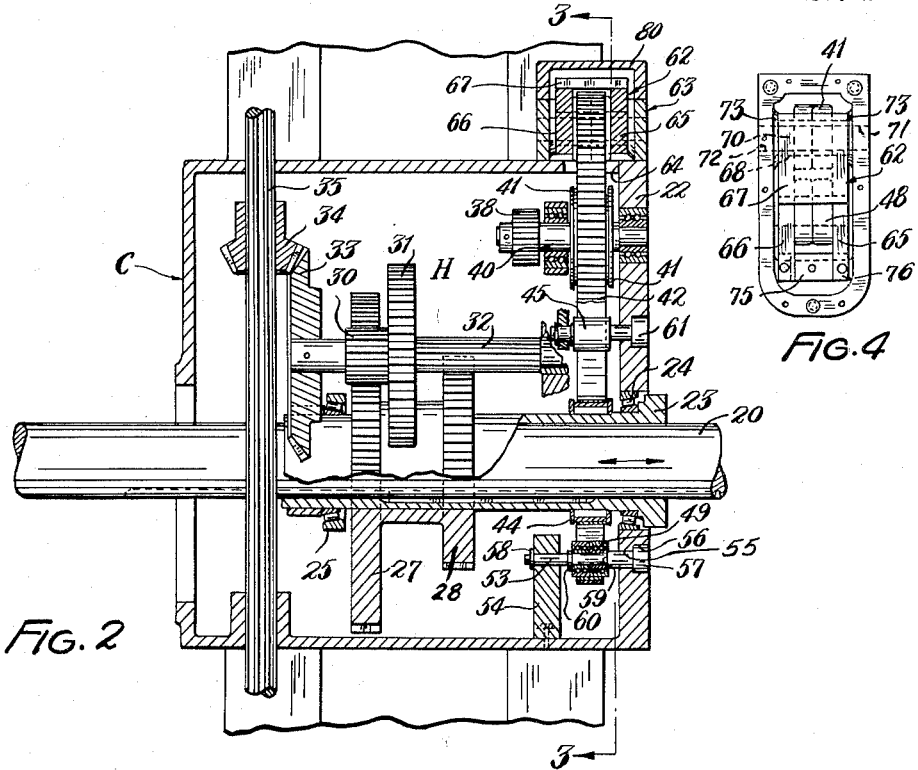
Fig. 2
Fig. 4
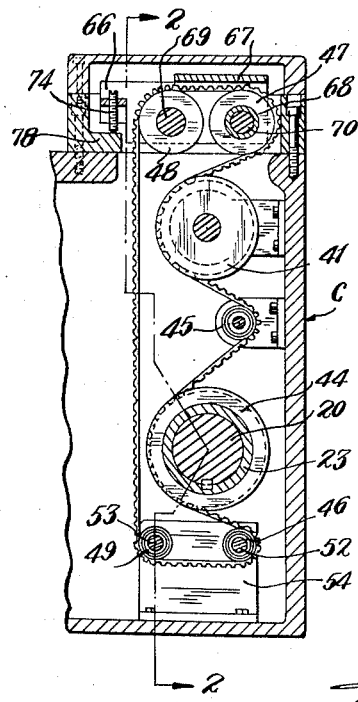
Fig. 3
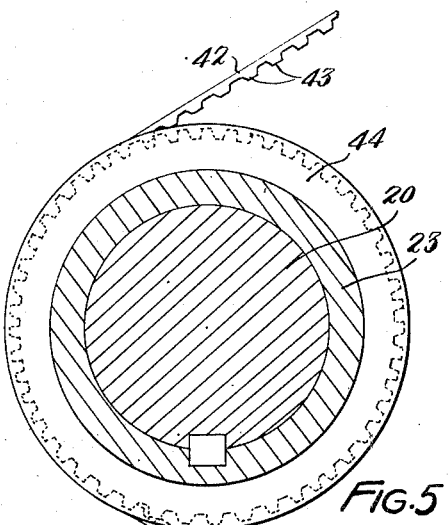
Fig. 5
INVENTOR.
HALLIS N. STEPHAN
BY Hudson, Boughton,
Williams, David & Hoffmann.
ATTORNEYS

United States Patent Office 2,775,130
Patented Dec. 25, 1956

2,775,130

COMBINED HORIZONTAL BORING, DRILLING AND MILLING MACHINE

Hallis N. Stephan, Cleveland Heights, Ohio, assignor to The New Britain Machine Company, New Britain, Conn., a corporation of Connecticut Application May 29, 1953, Serial No. 358,410

12 Claims. (Cl. 74—221)

The present invention relates to machine tools and, more particularly, to the support and drive mechanism for the tool spindle thereof and is especially suitable for use in a combined horizontal boring, drilling and milling machine.

Tool spindles of machines such as combined horizontal boring, drilling and milling machines have heretofore been provided with endless belt drives to rotate the tool spindle at high speeds because of the necessity of providing a smooth drive therefor. To enable the endless belt to be easily removed or installed, the belt drive has been located outwardly of the front spindle head bearing for supporting the spindle. With this arrangement the belt can be slipped over the end of the spindle. In putting the belt drive outwardly of the front spindle head bearing, the overhang of the tool end of the spindle must necessarily be increased to provide the space required for the driven portion of the belt drive. Since tool spindle deflection increases with increased overhang, it is desirable to keep the spindle overhang at a minimum. This is particularly important in combined horizontal boring, drilling and milling machines which utilize an extendible tool spindle.

The principal object of the present invention is the provision of a new and improved machine tool and, more particularly, a combined horizontal boring, drilling and milling machine comprising a power driven spindle supported by spaced bearings and having an improved endless belt drive connected to that portion of the spindle located between the two bearings, the belt drive being so constructed and arranged that the endless belt may be easily replaced without disturbing the bearings.

Another object of the present invention is to provide a new and improved machine tool and more particularly a combined horizontal boring, drilling and milling machine having a belt driven tool spindle and being so constructed and arranged that the belt drive for the tool spindle may be placed inside of the front bearing for the spindle, thereby allowing the bearing to be located so as to minimize deflection due to spindle overhang.

With these and other objects in view as may hereinafter appear, the several features of the invention consist in the devices, combinations and arrangements of parts hereinafter described and claimed which together with the advantages to be gained thereby will be readily understood by one skilled in the art from the following description taken in connection with the accompanying drawing, in which Fig. 1 is a perspective view of a combined horizontal boring, drilling and milling machine embodying my invention;

Fig. 2 is a detached view taken in the direction of the arrows along line 2—2 of Fig. 3 showing the driving and supporting mechanism for the tool spindle;

Fig. 3 is a view taken along lines 3—3 of Fig. 2;

Fig. 4 is a plan view of a portion of Fig. 2; and

Fig. 5 is an enlarged view of a portion of Fig. 3.

Figure 1:
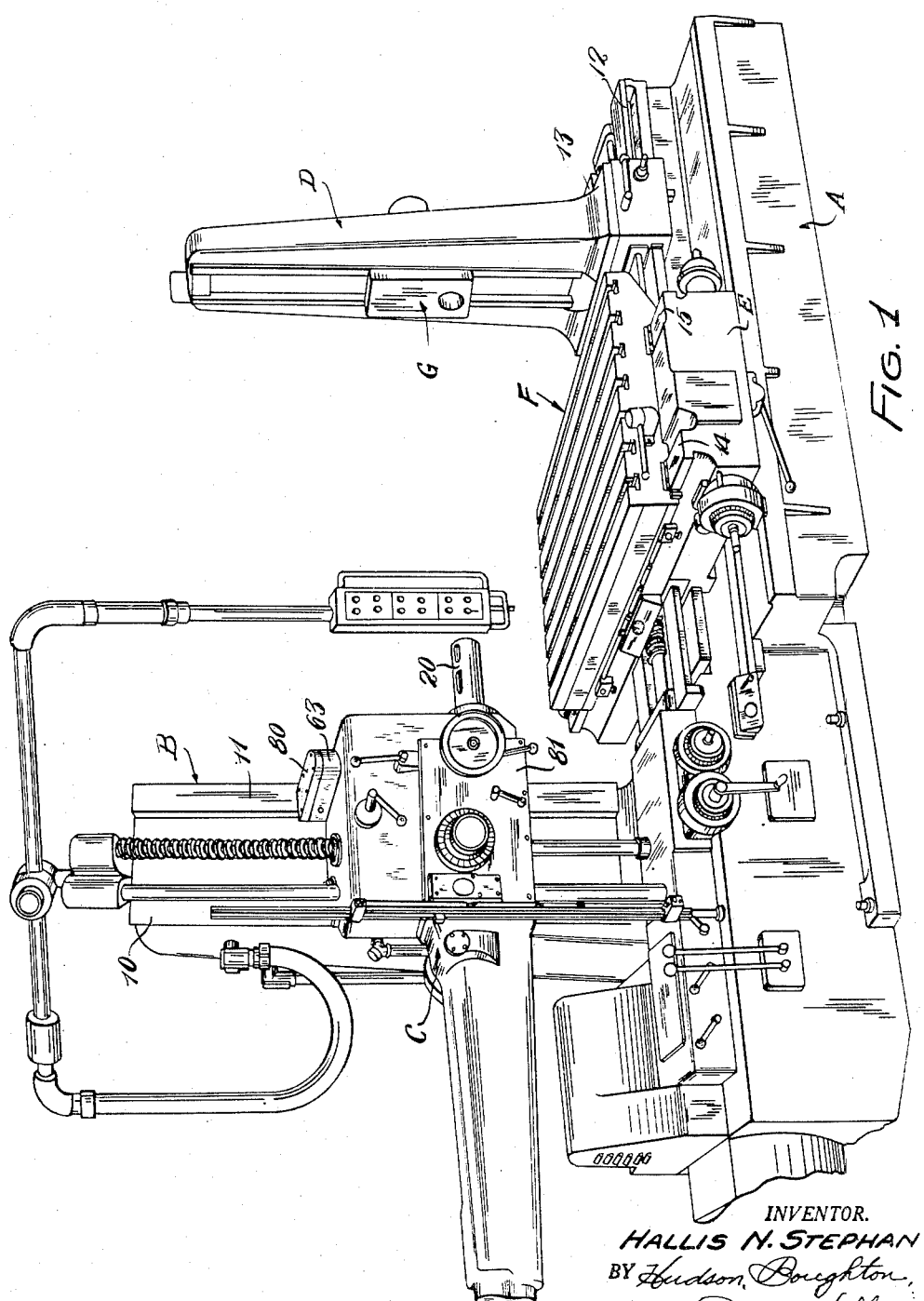

While the present invention may be utilized in various types of machine tools, for purposes of illustration, it has been embodied in a combined horizontal boring, drilling and milling machine where, as hereinbefore mentioned, it is particularly advantageous since such machines utilize extendible tool spindles and spindle overhang must be kept to a minimum. Referring to the drawings, the machine shown is generally of the type disclosed in the U. S. Patent to Lucas et al. 2,350,174 and comprises a base A, provided at one end with a spindle head column B formed with vertical ways 10 and 11 upon which a spindle head C is mounted for vertical movement, and at the other end with a backrest or an outboard support column D slidably supported on horizontal ways 12 and 13 on the upper side of the bed. The ways 12 and 13 also support a saddle E having transvesely extending hoizontal ways 14 and 15 on the upperside thereof which in turn supports a work table F. The backrest column D has vertical ways upon which a backrest blodk G is mounted for vertical movement. The spindle head, outboard support column D, saddle E, table F and backrest block G may be moved by any conventional mechanism the details of which are not necessary for the understanding of the present invention and are not shown.

The spindle head C supports a tool spindle 20, which spindle is adapted to be rotated by suitable driving mechanism indicated generally at H and which is more fully explained hereinafter. The spindle 20 is also adapted to be fed or rapidly traversed axially in either direction by a suitable mechanism. Since the construction of such a mechanism is conventional and not essential to the understanding of the present invention, it is not shown or herein described.

The forward ed or nose of the spindle 20 is adapted to receive the arbors of conventional boring machine tools or other tools to be used with the machine. The tool spindle 20 is supported horizontally within the spindle head C with the tool end of the spindle extending outwardly from the forward wall 22 of the spindle head housing. The spindle 20 is slidably keyed in a spindle quill 23 rotatively supported by a bearing 24 in the front wall 22 and by a bearing 25 in an intermediate wall within the spindle head housing. The spindle quill 23 has mounted thereon a gear cluster comprising gears 27 and 28 each of which may be selectively engaged respectively by gears 30 and 31 of a gear cluster mounted on a spline shaft 32. Suitable conventional means is provided to shift the gears 27, 28 in and out of engagement with the gears 30 and 31 respectively. The spline shaft 32 is driven by a bevel gear 33 mounted at the left hand end thereof and in mesh with a bevel gear 34 carried by a vertical spline shaft 35 extending through the spindle head housing. The shaft 35 is driven by a motor located in the bed of the machine through suitable change gears to provide various speeds of rotation of the shaft 35. The drive mechanism for the shaft 35 is conventional, forms no part of the present invention, and is therefore not shown in the drawing or described herein.

According to the present invention, to obtain a high speed drive for the spindle shaft 20, the gear 31 may be selectively meshed with a pinion 38 pinned to a horizontal shaft 40 journaled in the forward wall 22 of the spindle head housing and in a bracket projecting inwardly of the housing. The shaft 40 is located in a position above the spindle 20 and mounts a driving pulley 41. The spindle quill 23 and in turn the spindle 20 is adapted to be driven from the drive pulley 41 by an endless belt 42 which passes around a portion of the circumference of the driving pulley 41 so as to be driven thereby and also a portion of the circumference of a driven pulley 44 mounted on the spindle quill 23 adjacent to the interior side of the wall 22. Because of space limitations within machine tools and the requirement that the belt transmit high horsepower at relatively low belt speeds, a particularly suitable belt is a gear belt having transverse teeth or cogs 43 on the outside surface of the belt. Gear belts suitable for use with the present invention are sold under the trademark "Timing" by the New York Belting and Packing Co. The teeth 43 are adapted to mesh with corresponding gear teeth on the periphery of the driving pulley 41 and the driven pulley 44.

Guide or idler rollers 45 and 46, sometimes referred to as snub pulleys, are mounted respectively above and below the spindle 20 and engage the inside surface of the endless belt 42, the guide roller 45 being intermediate the driving pulley 41 and spindle 20. The portion of the endless belt between the guide rollers 45 and 46 defines a loop wherein the outside surface of the belt 42 forms the inside surface of the loop. The guide rollers 45 and 46 are so spaced with respect to the spindle 20 that the gear teeth 43 of the belt 42 in bight of the loop between guide rollers 45 and 46 mesh with the teeth on the periphery of the driven pulley 44 for rotating the spindle quill 23 and the spindle 20. A guide or idler roller 47 which may be termed a snub pulley is also mounted above the driving pulley 41 so that the portion of the belt between the guide rollers 47 and 45 defines a loop around the driving pulley 41 which engages the peripheral surface of the pulley 41 so that rotation of the pulley will impart a movement to the endless belt 42. As in the case of the driven pulley 44, the driving pulley 41 meshes with the outside surface of the endless belt. An upper return guide or idler roller 48, mounted laterally of idler roller 47, and a lower return guide or idler roller 49 mounted laterally of idler roller 46 are also provided for guiding and supporting the return side of the endless belt.

Guide rollers 46 and 49 are rotatably supported on shafts 52, 53, respectively, mounted horizontally between the forward wall 22 and a rib 54 extending upwardly from the bottom of the spindle head housing. The shaft 53 extends through an opening 55 in the forward wall 22, which opening is provided with a counterbore 56 at its outward end. The shaft 53 is provided with a head 57 adapted to fit the counterbore 56 for preventing inward displacement of the shaft. The shaft 53 also extends through the rib 54 and has a snap ring 58 on its interior end to abut the rib 54 for preventing outward movement of the shaft. The guide roller 49 is rotatively mounted on the shaft 53 between the forward wall 22 and the rib 54 and is prevented from lateral displacement thereon by a shoulder 59 at its forward end and a snap ring 60 at its other end. The guide roller 46 and the shaft 52 are mounted in a manner similar to the mounting for the roller 49 and the shaft 53. The guide roller 45 is rotatably supported on a horizontal shaft 61 mounted between the forward wall 22 and a bracket supported by the spindle head housing. The construction of shaft 61 is similar to that of shafts 52 and 53.

The upper guide rollers 47 and 48 are rotatably supported in a yoke 62 mounted for hinged movement in a casing 63 located on the top of the spindle head C above an opening 64 in the spindle head housing. The yoke 62 comprises spaced parallel plates 65, 66 which are secured together by a tie plate 67 on the upper side thereof. The idlers 47 and 48 are rotatably mounted on a sleeve 68 and a shaft 69, respectively, the sleeve and shaft being supported between the sides 66, 65 of the yoke. The yoke is mounted for hinged movement within the casing by a pin 70 which passes through the sleeve 68 and is supported in aligned apertures 71, 72 in opposite sides of the casing 63. Spacers 73 between the yoke and the casing prevent lateral movement of the yoke on the pin 70. The end of the yoke opposite the sleeve 68 is adjustably supported for movement toward and from the interior of the spindle head housing by a screw 74 threaded into a bar 75 which extends transversely of the plates 65, 66. The bottom of the screw engages the top of an inturned portion 78 of one end of the casing 63.

The screw 74 is adjustable to regulate the tension of the belt 42. The shaft 69, the sleeve 68, and the pin 70, are all removable to facilitate changing and installing the endless belt 42. The casing 63 is preferably detachable from the housing of the spindle head C and is provided with a removable cover 80. A front plate 81 forming a part of the front of the spindle head housing is also removable to allow access to the interior of the spindle head housing.

To install a new belt, the front plate 81 is removed as well as the yoke 62 and the casing 63. The belt is looped around the guide rollers 45 and is passed around the driving pulley 41 and the driven pulley 44. The shafts 52 and 53 may be pulled from the rib 54 in order to enable the belt to be looped around the guide rollers 46, 49 by removing the snap rings on the interior end of the shafts. It is to be noted that if desired, the rollers 46, 49 may also be removed from the shafts 52, 53 respectively by removing the snap rings at the end of each roller. After the belt has been passed around the driving pulley and driven pulley and also looped around the rollers 46, 49 the belt is pulled upwardly through the opening 64 and through the yoke 62 with the guide rollers 47, 48 removed. When the belt is in this position, the guide rollers 47, 48 are positioned in the yoke and the shaft 69 and the sleeve 68 are inserted into the rollers 48 and 47 respectively. After the guide rollers have been installed in the yoke 62 the casing 63 may be placed thereover, the pin 70 inserted through the sleeve 68, and the screw 74 adjusted to provide the proper tension on the belt. It is to be noted that the casing 63 is of such dimensions as to allow the inturned portion of the casing end to be slid under the adjusting screw 74 after the guide rollers and belt are positioned in the yoke 62.

It will be seen from the above description that I have provided a new and improved drive and support mechanism for tool spindles which allows the tool spindle to be supported in close proximity to its tool end and yet be driven by a readily changeable belt drive of novel construction. The belt drive is located on the spindle intermediate its support bearings and is of such construction that the belt may be easily replaced without dismantling the tool spindle or its support. While the preferred embodiment of the invention has been described in detail, the invention is not limited to the particular construction shown; and it is my intention to cover hereby all adaptations, modifications and uses thereof which come within the practice of those skilled in the art to which the invention appertains and which fall within the scope of the appended claims.

Having thus described my invention, I claim:

1. In a machine tool, a frame, a rotatable shaft supported by said frame, a belt drive for rotating said shaft comprising a continuous belt, a driving pulley for driving said belt, a driven pulley engaged by said belt and connected to said shaft for rotating said shaft, idler means for guiding said belt and adjustable to control the belt tension and comprising first and second rollers for engaging the inner side of said belt, a yoke comprising spaced parallel members, first and second parallel shafts removably supported intermediate said members for supporting said first and second rollers, respectively, said first shaft being hollow, and a removable pin within said first shaft having its outer ends supported by said frame, said yoke being movable about the axis of said pin to adjust the tension in said belt.

2. In a combined horizontal boring, drilling and milling machine, a spindle head housing including a rotatable spindle journally supported therein by spaced bearing supports, a belt drive within said housing for rotating said spindle comprising a driven pulley fixed to said spindle intermediate said bearing supports, a continuous belt for engaging and rotating said pulley, a driving pulley for driving said belt, means rotatably supporting said driving pulley within said housing in the plane of said driven pulley, said driving pulley and said driven pulley engaging the outer side of said belt, said housing having an opening in the plane of said pulleys, two spaced walls extending outwardly from said housing on opposite sides of said opening and parallel to said plane, idler means for guiding the movement of said belt and for adjusting the tension therein and comprising a frame having spaced members generally parallel to said walls, first and second guide rollers intermediate said members, first and and second parallel removable shafts supported between said members for supporting said first and second rollers, respectively, said first shaft being hollow, and a removable pin within said first shaft having its outer ends supported by said wall, said frame being movable about the axis of said pin to adjust the tension in said belt.

3. In a machine tool, a spindle head housing including a rotatable spindle, spaced bearing supports for said spindle, a continuous belt, drive means within said housing engaging the outer side of said belt for driving the latter, means engaging the outer side of said belt and driven thereby and operatively mounted to said spindle for rotating the latter, the last-said means being connected to said spindle intermediate said bearing supports, an idler means for supporting and guiding the movement of said belt.

4. In a machine tool, a housing, a rotatable spindle in said housing and extending outwardly from one wall thereof, said housing having spaced bearing supports for rotatably supporting said spindle, a continuous belt within said housing, a driven pulley within said housing and connected to said spindle intermediate said supports for rotating the latter, idler means for movably supporting said belt with the outer side of said belt defining an open loop about said driven pulley and in driving relationship therewith, and means engaging the outer side of said belt for driving said belt.

5. In a machine tool, a rotatable shaft, spaced bearing supports for said shaft, a belt drive for rotating said shaft comprising an endless belt having interlocking means on its outer surface, a pulley mounted in driving relationship with said shaft intermediate said bearing supports and having interlocking means for cooperating with the first-mentioned interlocking means about its periphery, a driving pulley having interlocking means for cooperating with the first-mentioned interlocking means about its periphery, idler means supporting and guiding said belt around said pulleys with said belt defining an open loop about each of said pulleys and the interlocking means on said belt meshing with the interlocking means on said pulleys.

6. In a machine tool, a spindle head housing including a rotatable spindle, spaced bearing supports for said spindle, a belt drive for rotating said spindle comprising a continuous belt having spaced cogs on the outer side thereof, a driven pulley on said spindle intermediate said bearing supports and having spaced cogs on the periphery thereof for meshing with said cogs on said belt, idler means for supporting and guiding the movement of said belt including first and second idler rollers respectively on opposite sides of said spindle for guiding said belt about the periphery of said driven pulley with the belt between said first and second idler rollers defining an open reentrant loop about the periphery of the pulley, and means engaging the outer side of said belt for driving the latter.

7. In a machine tool, a rotatable spindle, spaced bearing supports for said spindle, a belt drive for said spindle comprising a continuous belt, a driving pulley engaging the outer side of said belt for driving the latter, a driven pulley operatively connected to said spindle intermediate said bearing supports for rotating the latter upon rotation of the pulley, and a plurality of guide rollers for guiding and supporting said belt including a first guide roller intermediate said pulleys and a second guide roller adjacent to said driven pulley and spaced from said first guide roller and a third guide roller adjacent to said driving pulley and spaced from said first guide roller, said guide rollers engaging the inner side of said continuous belt with the portion of said belt between said first and second rollers defining an open loop with the outer side of said continuous belt forming the inner side of the loop and the bight of said loop engaging said driven pulley and the portion of said belt between said first and third rollers defining an open loop about the periphery of said driving pulley.

8. In a machine tool, a rotatable spindle, a belt drive for said spindle comprising a continuous gear belt having spaced cogs on its outer side, drive means engaging the outer side of said belt for driving the latter, a driven pulley disposed on one side of said drive means and operatively connected to said spindle for rotating the latter upon rotation of said pulley, said driven pulley having a peripheral surface with spaced cogs thereon for meshing with the cogs on said belt, a plurality of idler rollers for supportnig said belt and guiding the movement thereof and including first and second idler rollers on opposite sides of said spindle, respectively, and engaging the inner side of said belt with the portion of said belt between said first and second rollers defining an open reentrant loop with the bight of said loop engaging said driven pulley.

9. In a machine tool, a spindle head housing having spaced walls, a rotatable spindle journalled between said walls and extending from one of said walls outwardly from said housing with the extended end of said spindle being unsupported, a continuous belt within said housing, a pulley operatively connected to said spindle intermediate said walls for rotating said spindle, idler means for supporting and guiding the movement of said belt and including first and second idler rollers respectively disposed on opposite sides of said spindle and engaging the inner side of said belt for guiding said belt about said driven pulley with the portion of said belt between said first and second idler pulleys defining an open loop about said driven pulley and engaging the periphery thereof, and a driving pulley engaging the outer side of said belt for driving the latter.

10. In a machine tool, a spindle head housing, a spindle to be rotated comprising spaced bearing supports for said spindle, a spindle drive pulley operatively connected to said spindle intermediate said spaced bearing supports and having spaced cogs about its periphery, a continuous belt having spaced cogs on the outer side thereof adapted to mesh with the cogs on said pulley, a driving pulley having spaced cogs about its periphery, means rotatably supporting said driving pulley in spaced relationship to and in the same plane as said spindle drive pulley, idler means for guiding the movement of said belt and for guiding said belt in open loops about said pulleys comprising an idler roller intermediate said driving pulley and said spindle pulley, and second and third idler rollers adjacent to said spindle pulley and said drive pulley respectively and spaced from said first-mentioned idler roller, the portion of said belt between the last-mentioned idler rollers and the first-mentioned idler rollers defining individual open loops about said drive pulley and said spindle pulley with the cogs in the bight of the respective loops meshing with the cogs on the periphery of the respective pulley, said idler means engaging the inner side of said belt.

11. In a machine tool, the apparatus as described in claim 10 wherein said idler means include an adjustable roller in engagement with said belt for adjusting the tension of said belt.

12. In a machine tool, a rotatable shaft, spaced bearing supports for said shaft, a first pulley operatively connected to said shaft intermediate said bearing supports for rotating the latter upon rotation of the pulley, first and second idler rollers spaced about the periphery of said first pulley, a continuous belt passing over said first and second idler rollers and defining an open loop therebetween with the bight of the loop in engagement with the periphery of said pulley, a driving pulley engaging the outer side of said belt for driving said belt, said driving pulley being spaced from said first pulley, a third idler roller adjacent to said driving pulley on a side thereof remote from said first idler roller, the portion of said belt intermediate said first idler roller and said third idler roller defining an open loop about the periphery of said driving pulley with the outer side of the belt in engagement with the pulley, and a plurality of idler rollers supporting and guiding the return movement of the belt between said second idler roller and said third idler roller.

References Cited in the file of this patent

UNITED STATES PATENTS

| | | |
|---|---|---|
| 245,988 | Williams | Aug. 23, 1881 |
| 389,719 | Shepherd | Sept. 18, 1888 |
| 840,729 | Willson | Jan. 8, 1907 |
| 2,397,312 | Forrest | Mar. 26, 1946 |
| 2,507,330 | Balsiger | May 9, 1950 |